United States Patent
Lin et al.

(10) Patent No.: US 7,751,145 B1
(45) Date of Patent: Jul. 6, 2010

(54) DISK DRIVE WITH AIR CHANNEL

(75) Inventors: Jen-Tai Lin, Cupertino, CA (US); Jacky S. Wong, Palo Alto, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 722 days.

(21) Appl. No.: 11/652,960

(22) Filed: Jan. 12, 2007

(51) Int. Cl.
*G11B 33/14* (2006.01)
(52) U.S. Cl. .................................................. 360/97.02
(58) Field of Classification Search ........................ None
See application file for complete search history.

(56) References Cited

U.S. PATENT DOCUMENTS

| | | | |
|---|---|---|---|
| 4,008,492 A | 2/1977 | Elsing | |
| 4,581,668 A | 4/1986 | Campbell | |
| 4,583,213 A | 4/1986 | Bracken et al. | |
| 4,780,776 A | 10/1988 | Dushkes | |
| 5,406,431 A | 4/1995 | Beecroft | |
| 5,631,787 A | 5/1997 | Huang et al. | |
| 5,696,649 A | 12/1997 | Boutaghou | |
| 6,369,978 B1 | 4/2002 | Shimizu et al. | |
| 6,507,452 B1 | 1/2003 | Bae et al. | |
| 6,542,328 B2 * | 4/2003 | Harrison et al. | 360/97.03 |
| 6,549,365 B1 | 4/2003 | Severson | |
| 6,560,066 B2 | 5/2003 | Imai et al. | |
| 6,636,379 B2 | 10/2003 | Rannow et al. | |
| 6,654,201 B2 | 11/2003 | Smith | |
| 6,665,139 B2 | 12/2003 | Tokuyama et al. | |
| 6,728,062 B1 | 4/2004 | Ou-Yang et al. | |
| 6,765,751 B2 | 7/2004 | Huang et al. | |
| 6,791,790 B2 | 9/2004 | Lee | |
| 6,876,514 B1 | 4/2005 | Little | |
| 6,894,867 B2 | 5/2005 | Hong et al. | |
| 6,898,048 B2 | 5/2005 | Adams et al. | |
| 6,930,856 B2 | 8/2005 | Wang et al. | |
| 6,971,790 B2 | 12/2005 | Quinn et al. | |
| 6,980,392 B2 | 12/2005 | Pierson | |
| 6,999,273 B2 | 2/2006 | Tsang et al. | |
| 7,002,774 B2 | 2/2006 | Adams | |
| 7,057,850 B2 | 6/2006 | Hong et al. | |
| 7,211,935 B1 | 5/2007 | Houk | |
| 7,312,950 B2 * | 12/2007 | Voights et al. | 360/97.02 |
| 7,353,524 B1 | 4/2008 | Lin et al. | |
| 2002/0135933 A1 * | 9/2002 | Harrison et al. | 360/97.02 |
| 2003/0081350 A1 | 5/2003 | Wang et al. | |
| 2003/0137769 A1 * | 7/2003 | Wang et al. | 360/97.02 |
| 2003/0231424 A1 | 12/2003 | Hong et al. | |
| 2005/0185325 A1 | 8/2005 | Hur | |
| 2005/0185327 A1 * | 8/2005 | Voights et al. | 360/97.03 |
| 2007/0097545 A1 * | 5/2007 | Yoo et al. | 360/99.12 |
| 2008/0094747 A1 * | 4/2008 | Chan et al. | 360/97.02 |
| 2008/0100957 A1 * | 5/2008 | Gross et al. | 360/97.02 |

* cited by examiner

*Primary Examiner*—Mark Blouin

(57) ABSTRACT

A disk drive baseplate includes a raised major surface oriented essentially parallel to the disk, a recessed major surface, and a boundary contour between the raised major surface and the recessed major surface. In one embodiment, the baseplate further includes an air channel adjacent to and at least partially outboard of the raised major surface, wherein the air channel includes the recessed major surface.

15 Claims, 4 Drawing Sheets

DISK DRIVE WITH AIR CHANNEL

FIELD OF THE INVENTION

The invention relates in general to data storage systems such as disk drives, and in particular to incorporating an air channel into a disk drive baseplate.

BACKGROUND OF THE INVENTION

Disk drives typically store data on magnetic and/or optical storage media which rotates about a central axis. This rotation creates airflow within the disk drive having both radial and axial velocities, which in turn produces a pressure gradient near the outer disk edge. As disk rotation speeds increase, the resulting rotation-induced airflow tends to increase undesirable disk flutter.

In addition to disk flutter, rotation-induced airflow also tends to move particles that may enter the microscopic space between the disk drive's read/write head(s) and the disk surface(s), thereby resulting in possible component damage or read/write errors. To avoid this, recirculation filters may be oriented near the outer disk edge in the path of the airflow in order to filter out particles which become airborne during disk drive operation. Since filtration efficiency is direct related to disk performance and longevity, there is a need for a disk drive design which improves filtration efficiency by improving the airflow characteristics of disk drives.

SUMMARY OF THE INVENTION

Disclosed and claimed herein is a disk drive having a spindle motor, a disk mounted to the spindle motor, and a baseplate to which the spindle motor is attached. The baseplate includes a raised major surface oriented essentially parallel to the disk, a recessed major surface, and a boundary contour between the raised major surface and the recessed major surface. The boundary contour is disposed along an arc of constant radius for at least 90° about the disks axis of rotation, wherein the constant radius is less than the disk radius. The baseplate further includes an air channel adjacent to and at least partially outboard of the raised major surface, wherein the air channel includes the recessed major surface.

Other aspects, features, and techniques of the invention will be apparent to one skilled in the relevant art in view of the following detailed description of the example embodiments of the invention.

DETAILED DESCRIPTION OF THE EXEMPLARY EMBODIMENTS

The present disclosure relates to a disk drive having a baseplate that includes a raised major surface oriented essentially parallel to the disk and a recessed major surface. In certain embodiments, a boundary contour between the raised major surface and the recessed major surface is disposed along an arc of constant radius for at least 90° about an axis of rotation for the disk. In certain embodiments, the boundary contour's constant radius is less than the disk radius, such that at least a portion of the recessed major surface is inboard of an outer disk edge. An air channel, which includes the recessed major surface, may be adjacent to and at least partially outboard of the raised major surface.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Figure 1:
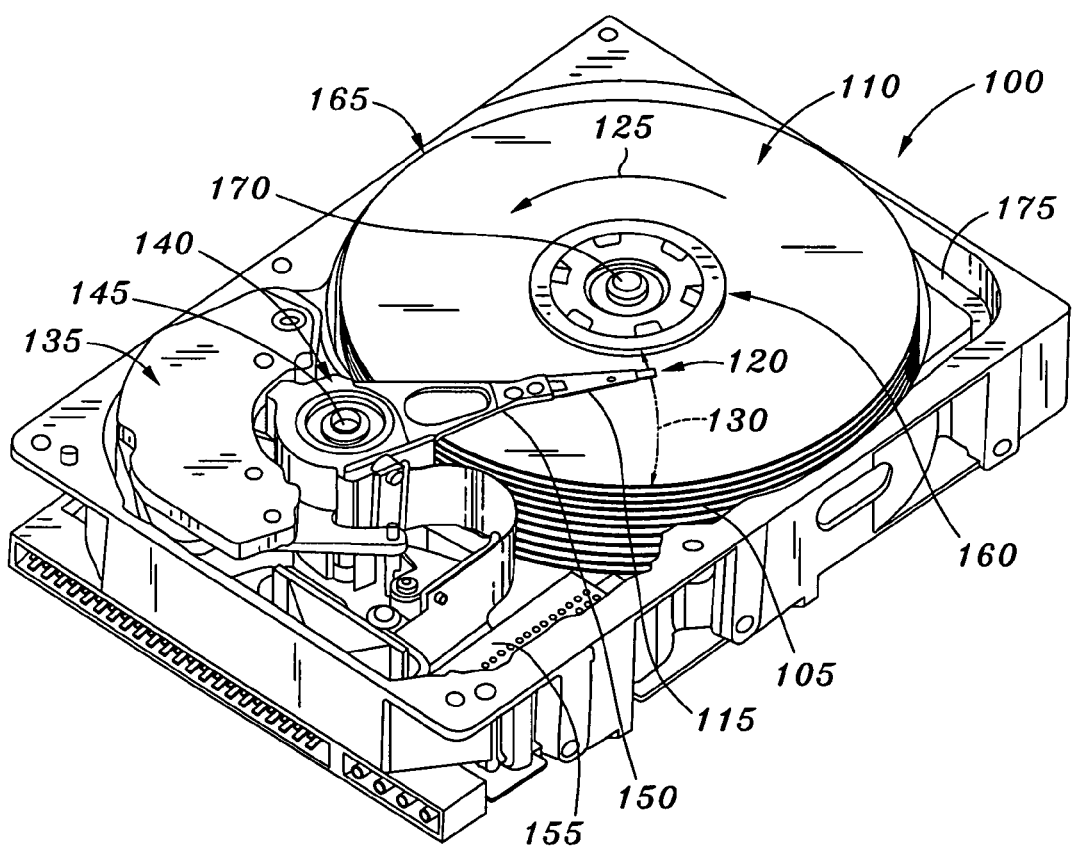
FIG. 1 is a perspective view of a disk drive with internal components consistent with one embodiment of the invention.

Referring now to the figures, FIG. 1 illustrates a disk drive storage device 100 designed in accordance with one embodiment of the invention. Disk drive 100 includes a disk pack 105 having one or more disks, each of which have at least one storage surface 110 comprised of a magnetic material or optically-readable material. Each disk in the disc pack 105 is accessible by a head stack assembly 115 that includes a read/write head 120. The read/write head 120 includes a small transducer and a slider that mechanically supports the transducer. The slider is further configured to create an air bearing which maintains a constant distance between storage surfaces 110 and the read/write head 120.

A spindle motor 170 drives rotation of the disks in the disk pack 105 in the direction shown by arrow 125, thereby generating rotation-induced airflow within the disk drive 100 that is characterized by both radial and axial velocities as measured from the disk axis of rotation 175.

As the disks are rotated, the head stack assembly (HSA) 140 accesses different locations on the storage surfaces 110 of the disks. In particular, the HSA 140 is actuated for radial movement relative to the storage surfaces 110, such as in a direction indicated by arrow 130, in order to access the different tracks (or radial positions) on the storage surfaces 110. Such actuation of the HSA 140 is provided by a servo system that typically includes a voice coil motor (VCM) 135, which pivots the HSA 140 about an axis 145. The storage surfaces 110 extend from a central hub 160. The central hub 160 and attached disk pack 105 are rotated by the spindle motor 170, which is itself secured to a baseplate 165. HSA 140 also includes at least one arm 150 that supports the head gimbal assembly (HGA) 115. The HGA 115 includes head 120. Disk drive 100 further includes circuitry 155 for helping to control operation of disk drive 100 and/or for helping to transfer data to and from the disk drive 100. The spindle motor 170, HSA 140, VCM 135 and disk pack 105 may then be enclosed with a cover (not shown) that is sealed to the baseplate 165.

Continuing to refer to FIG. 1, the baseplate 165 further includes air channel 175 disposed along a path that is at least partially disposed inboard of the outer disk edge of the disk pack 105. Additional embodiments and details of the air channel 175 will be discussed below with respect to FIGS. 2-3.

Figure 2:
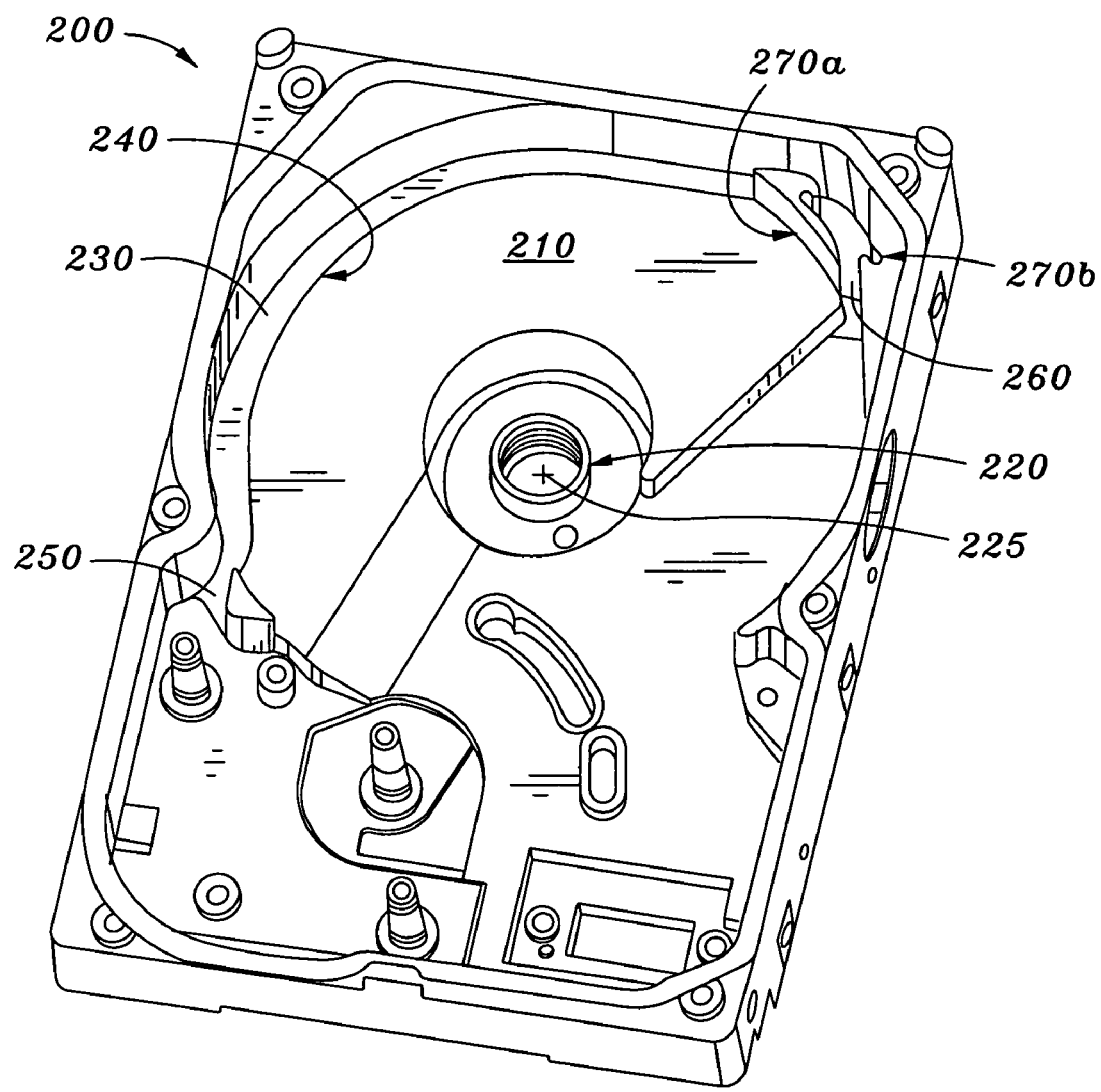
FIG. 2 is a perspective view of a disk drive baseplate designed in accordance with one embodiment of the invention.

FIG. 2 depicts a baseplate 200 usable in a hard disk drive assembly (e.g., disk drive 100) consistent with one embodiment of the invention. As shown, the baseplate 200 includes a raised major surface 210 oriented essentially parallel to the plane in which the disks (e.g., disk pack 105) are installed. The baseplate 200 further includes an attachment area 220 configured to attach a spindle motor (e.g., spindle motor 170) to the baseplate 200, and which is located essentially at an axis of rotation 225 for the disk(s).

The baseplate 200 further includes a recessed major surface 230, which is separated from the raised major surface 210 by a boundary contour 240. In certain embodiments, the boundary contour 240 may be disposed along an arc of constant radius for at least 90° about the axis of rotation 225, as shown in FIG. 1. In certain embodiments, the constant radius of the boundary contour 240 may be less than the disk radius such that at least a portion of the installed disk(s) overlaps with the recessed major surface 230.

The recessed major surface 230 forms an air channel adjacent to and at least partially outboard of the raised major surface 210. The air channel, which includes the recessed major surface is bounded by the boundary contour 240, and extends from a channel inlet 260 to a channel outlet 250. During disk drive operation, rotation-induced airflow will tend to enter through the channel inlet 260 and exit through channel outlet 250. The channel outlet 250 may be located in the vicinity where the voice coil motor (e.g., VCM 135) is located. In certain embodiments, this enables the rotation-induced airflow to impinge on the VCM, thereby tending to cool at least some of the VCM's components.

With respect to the air channel formed by the recessed major surface 230, there is a channel depth measured parallel to the axis of rotation 225 from the raised major surface 210 to the recessed major surface 230. In one embodiment, this channel depth is between 1 mm and 6 mm for a 3.5-inch disk drive. Regardless of form factor, the channel depth may be represented as a ratio of the disk radius for the disk drive in question to the channel depth itself. In one embodiment, this channel depth ratio is between 8 and 48.

Additionally, the channel formed by the recessed major surface outboard of the boundary contour 240 has a width measured along a radius extending from the axis of rotation 225. In one embodiment, this channel width is between 2 mm and 8 mm for a 3.5-inch form factor disk drive. Regardless of disk drive form factor, the channel width may be represented as a ratio of the disk radius for the disk drive in question to the channel width itself. In one embodiment, this channel width ratio is between 6 and 24.

A recirculation filter (not shown) may be placed adjacent to the channel inlet 260, which itself may be located either upstream or downstream of the filter. In the embodiment of FIG. 2, the baseplate 200 includes components 270a and 270b usable for securing a recirculation filter in place.

Figure 3:
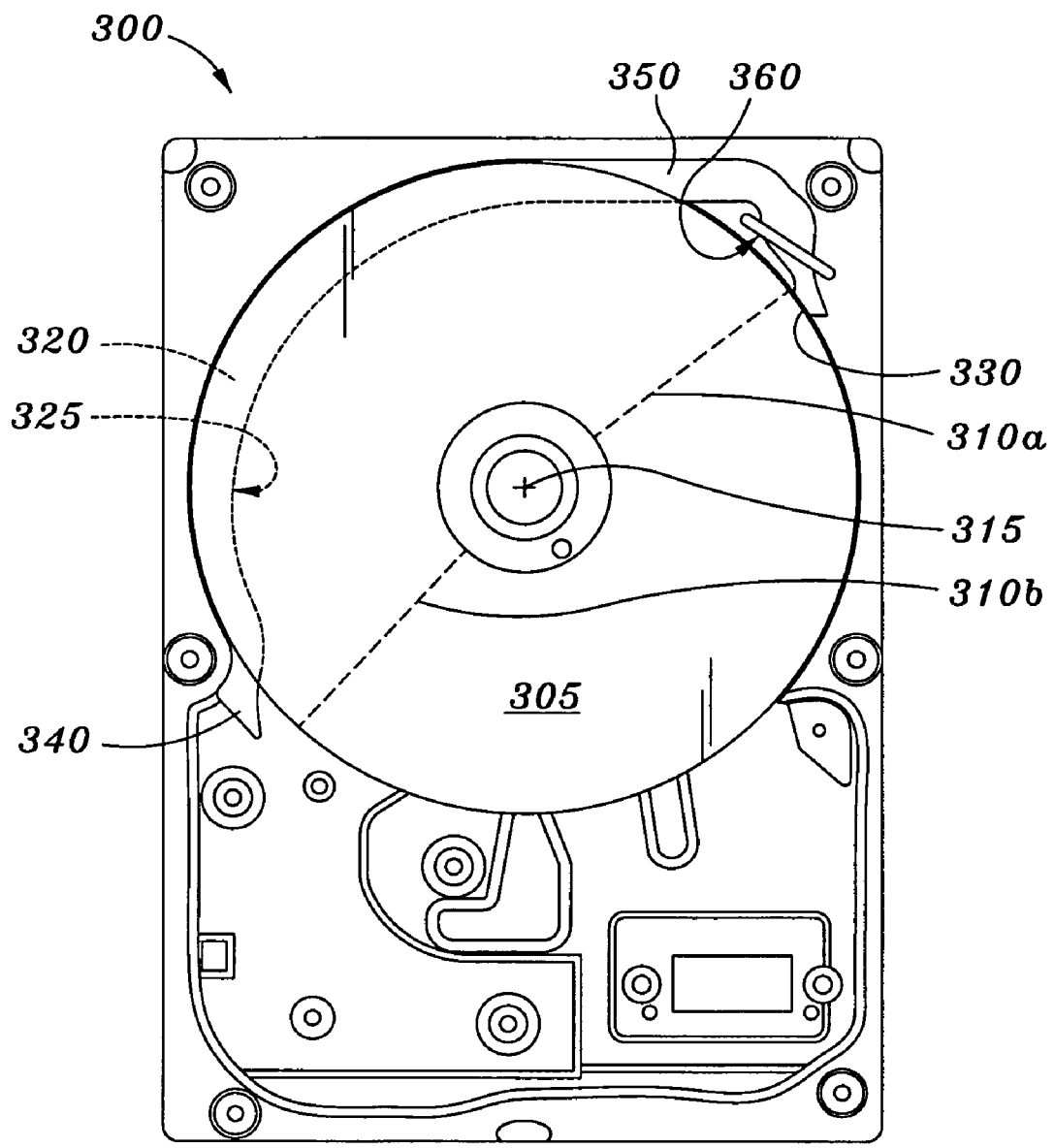
FIG. 3 is a top view of one embodiment of a disk drive baseplate with one or more disks in place.

FIG. 3 depicts a top view of another embodiment of a baseplate 300 usable in a hard disk drive assembly (e.g., disk drive 100). Unlike the embodiment of FIG. 2, in this embodiment one or more disks 310 are depicted in the installed position. The baseplate 300 includes a recessed major surface 320, which is separated from a raised surface by a boundary contour 325. In certain embodiments, the boundary contour 325 is disposed along an arc of constant radius for at least 90° about the axis of rotation 315. Additionally, the raised surface, which in this case is hidden beneath the disk(s) 310, has both a beginning side 310a and an ending side 310b measured counterclockwise with respect to the axis of rotation 315.

FIG. 3 further depicts an embodiment of the baseplate 300 in which the recessed major surface 320 forms an air channel adjacent to and outboard of the boundary contour 325. This air channel is further characterized by an inlet 330 and an outlet 340. As with the embodiment of FIG. 2, during disk drive operation, the primary rotation-induced airflow tends to pass through inlet 330 and exit through the outlet 340.

Also depicted in FIG. 3 is the fact that the recessed major surface 320 includes an exposed portion 350 which does not reside beneath installed disk(s) 310. In certain embodiments, portion 350 may include a recirculation filter 360 for filtering the rotation-induced airflow which enters through the inlet 330 during disk drive operation.

In certain embodiments, the recessed major surface 320 forms an air channel outboard of the boundary contour 325, and which has a width measured along a radius extending from the axis of rotation 315. As with the embodiment of FIG. 2, this channel width may be between 2 mm and 8 mm for a 3.5-inch disk drive form factor, or may represented as a ratio of the disk radius to the channel width itself. In one embodiment, this channel width ratio is between 6 and 24. Additionally, the air channel is at least partially beneath the outer edge of disk(s) 310, as shown in FIG. 3.

Figure 4:
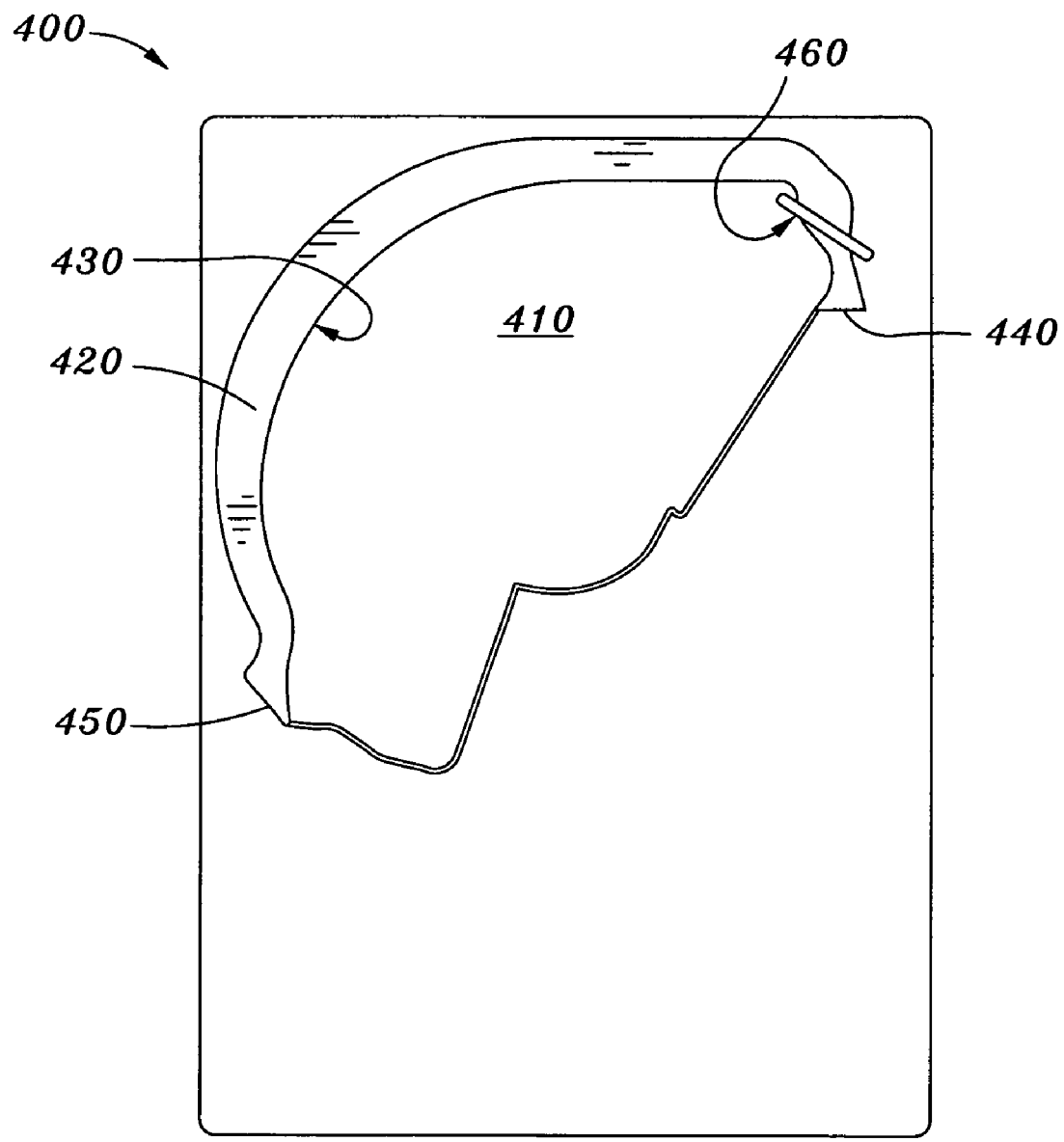
FIG. 4 is a disk drive cover designed in accordance with one embodiment of the invention.

Referring now to FIG. 4, depicted is an inside major surface of a disk drive top cover 400, according to one embodiment of the invention. The top cover 400 may be mounted to a disk drive baseplate, such as baseplate 200 or 300. In the embodiment of FIG. 4, the top cover 400 includes a first major surface 420 and a second major surface 410, both of which are oriented essentially parallel to the disk(s) of a disk drive when in the installed position. In certain embodiments, the second major surface 410 is disposed closer to the disk(s) than the first major surface 420 when in the installed position.

The first major surface 420 and second major surface 410 are further depicted as being separated by boundary 430. The first major surface 420 forms a top air channel that is radially bounded by boundary 430 and an inner wall of the baseplate when in the installed position (e.g., baseplate 200 or 300). As with the air channels discussed above, the top air channel of FIG. 4 has an inlet 440 and an outlet 450. In certain embodiments, during disk drive operation, rotation-induced airflow tends to pass through inlet 440 and exit through the outlet 450. In addition, a recirculation filter 460 may be situated adjacent to the inlet 440, which itself may be located either upstream or downstream of the filter. The top air channel may have a depth, radial width and radial extent consistent in dimensions and/or ratios with the air channels referred to above with respect to FIG. 2-3.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A disk drive comprising:
   a spindle motor;
   a disk mounted on the spindle motor, the disk having an axis of rotation and a disk circumference defined by an outer disk edge; and a baseplate to which the spindle motor is attached, the baseplate including, a raised major surface oriented essentially parallel to the disk and a recessed major surface, and a boundary contour between the raised major surface and the recessed major surface, the boundary contour disposed along an arc of constant radius for at least 90° about the axis of rotation, the constant radius being less than the disk radius; and an air channel adjacent to and partially outboard of the outer disk edge, wherein the air channel includes the recessed major surface, and wherein the air channel has a channel depth measured parallel to the axis of rotation from the raised major surface to the recessed major surface.

2. The disk drive of claim 1, wherein the air channel is further defined by a channel inlet and a channel outlet.

3. The disk drive of claim 2, wherein a recirculation filter is disposed outboard of the outer disk edge and adjacent to the channel inlet.

4. The disk drive of claim 3, wherein the channel inlet is located downstream of the recirculation filter.

5. The disk drive of claim 2, further comprising a voice coil motor located closer to the channel outlet than to the channel inlet, and located closer to the channel outlet than to the axis of rotation.

6. The disk drive of claim 2, further comprising rotation-induced airflow disposed within the air channel, wherein said airflow enters the air channel at a channel inlet and exits the air channel at a channel outlet end.

7. The disk drive of claim 1, wherein a ratio of a disk radius of the disk to the channel depth is between 8 and 48.

8. The disk drive of claim 1, wherein the air channel has a channel width measured along a radius extending from the axis of rotation, and wherein a ratio of the disk radius to the channel width is between 6 and 24.

9. The disk drive of claim 1, wherein the air channel is adjacent to the boundary contour for at least 90 degrees about the axis of rotation.

10. The disk drive of claim 1, further comprising a cover mounted to the base plate, wherein the cover includes, a first major surface that faces the disk;

a second major surface oriented essentially parallel to the disk, wherein the second major surface is disposed closer to the disk than the first major surface; and a top air channel including the first major surface and bounded by an inner wall of the baseplate.

11. A disk drive comprising:

a spindle motor;

a disk mounted on the spindle motor, the disk having an axis of rotation and a disk circumference defined by an outer disk edge; and a baseplate to which the spindle motor is attached, the baseplate including, a raised base having a raised major surface oriented essentially parallel to the disk, the raised major surface being disposed closer to the disk than another major baseplate surface, and a means for channeling rotation-induced air flow along a path outboard of the raised base for at least 90 degrees about the axis of rotation.

12. The disk drive of claim 11, wherein the means for channeling further comprises a means for filtering in the path.

13. The disk drive of claim 11, wherein the means for channeling further comprises a means for receiving the rotation-induced air into the path, and a means for directing the rotation-induced air out of the path.

14. The disk drive of claim 13, wherein the means for directing directs the rotation-induced air to impinge upon a component of a voice coil motor of the disk drive.

15. The disk drive of claim 11, further comprising a cover mounted to the baseplate, and wherein the cover includes a second means for channeling rotation-induced air flow along the path.

\* \* \* \* \*